Figure 1:
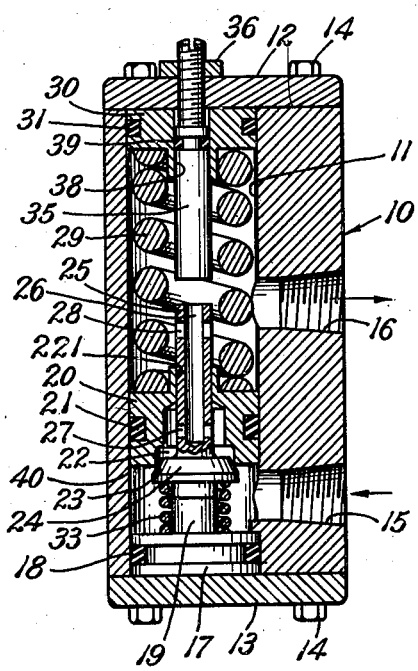

May 31, 1949.  F. W. SCHNECK  2,472,049

RELIEF VALVE

Filed Dec. 3, 1945

INVENTOR.
F. W. SCHNECK
BY
*E. Woodbury*
ATTORNEY

Patented May 31, 1949

2,472,049

UNITED STATES PATENT OFFICE 2,472,049

RELIEF VALVE

Frederick W. Schneck, Pacific Palisades, Calif., assignor to Bendix Aviation Corporation, South Bend, Ind., a corporation of Delaware Application December 3, 1945, Serial No. 632,325

2 Claims. (Cl. 137—53)

This invention relates to relief valves for releasing fluid from a line when the fluid pressure therein exceeds a predetermined limit and thereby preventing the creation of excessive pressures in the line.

An object of the invention is to provide a simple and compact relief valve capable of handling relatively large flow.

Another object is to provide a relief valve of simple and inexpensive construction that maintains substantially constant pressure despite wide variations in the rate of flow therethrough.

Another object is to provide a spring-loaded relief valve that can be adjusted to operate at different pressures without varying the spring loading.

Another object is to provide a spring-loaded poppet type relief valve in which the seating force between the poppet and seat is relatively light for a given flow capacity and pressure.

Another object is to provide an adjustable relief valve in which the adjusting element is normally not stressed, whereby adjusting movement is facilitated.

Other more specific objects and features of the invention will become apparent from the detailed description to follow of a particular embodiment of the invention.

Broadly, the invention resides in a relief valve of the poppet type in which the fluid pressure is applied in such direction as to tend to urge the poppet against the seat and the seat is moved clear of the poppet by fluid pressure thereagainst instead of the poppet being moved by fluid pressure away from the seat. Such an arrangement has the advantage that the area of the movable seat exposed to fluid pressure can be made smaller than the area of the poppet, thereby making possible the use of a lighter spring than would be required in a conventional poppet type relief valve of the same capacity. Further, in accordance with the invention, I permit the poppet to be moved with the seat through an initial portion of the opening movement of the seat and provide an adjustable stop for contacting the poppet and preventing it from moving during the latter part of the seat movement. By adjusting the position of the stop, it can be caused to contact the poppet and open the valve at different positions in the stroke of the seat, thereby varying the pressure at which the valve opens.

Another feature of the invention resides in an arrangement of the poppet and seat such as to cause relatively large opening movement of the seat relatively to the poppet in response to slight increases in the pressure following initial opening of the valve, so that the valve is capable of discharging both small and large flows with little variation in the applied pressure.

Figure 2:
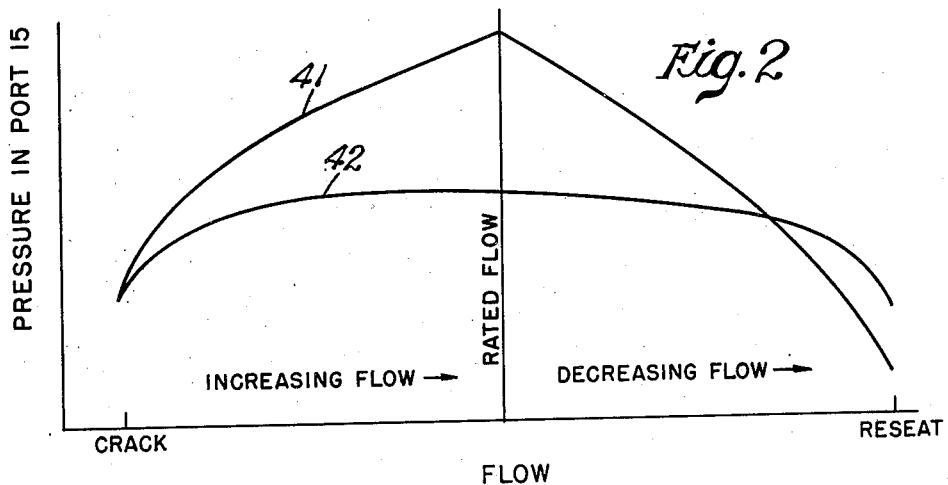

In the drawing:

Fig. 1 is a longitudinal section through a valve, in accordance with the invention; and Fig. 2 is a graph illustrating the flow characteristic of the valve.

Referring to Fig. 1, the valve therein disclosed comprises an elongated body member 10 which may be of generally cylindrical exterior shape and provided with a central longitudinal bore 11 extending completely therethrough but closed at its opposite ends by end closure plates 12 and 13 respectively which may be secured to the body 10 by screws 14. The body 10 contains a pressure port 15 communicating with the bore 11 near its lower end and a relief port 16 communicating with the bore at a point near its middle.

Positioned within the lower end of the bore 11 is an insert 17 which is sealed with respect to the bore by a sealing ring 18, and constitutes a fluid-tight plug for the lower end of the bore. This insert 17 is provided with an upwardly extending boss 19 for a purpose to be described later.

Slidably positioned within the bore 11, intermediate the pressure port 15 and the relief port 16, is a movable seat member 20 which has a cylindrical exterior surface fitted to the bore 11 and has an annular sealing ring 21 for preventing fluid leakage therepast. This seat member 20 has a central recess 22 of relatively large diameter in its lower face and the lower edge of this recess constitutes a valve seat 23 for a poppet 24. The recess 22 merges into a smaller valve stem passage 221 at the upper end of the seat member 20, which passage slidably receives the hollow stem 25 of the poppet 24. The passage 26 defined by the hollow stem is communicated with the exterior through radial ports 27 adjacent the poppet 24 and radial ports 28 adjacent the free end of the stem.

The seat member 20 is urged downwardly by a helical spring 29 which is compressed between the seat member 20 and a closure member or insert 30 which is positioned in the upper end of the bore 11 and is sealed with respect thereto by a sealing ring 31. The insert 30 rests against and is supported by the end plate 12.

When there is no pressure existant in the port 15, downward movement of the seat member 20 in response to the force of the spring 29 is limited by contact of the seat 23 with the poppet 24, and contact of the poppet 24 with the boss 19. A light helical compression spring 33 is interposed between the insert 17 and the poppet 24 to constantly urge them apart.

Upward movement of the poppet 24 is limited by an adjustable stop 35 which extends axially into the bore 11 through the end plate 12, being threaded in the plate 12 so that it can be adjusted longitudinally by rotating it. A stop nut 36 is provided to lock the stop 35 in a desired position of adjustment. The stop 35 also extends through and is fitted in a central passage 38 in the closure member 30, and is provided with a sealing ring 39 to prevent leakage of fluid therepast.

The valve functions as follows:

When there is no pressure in the pressure port 15, the spring 29 urges the seat member 20 and the poppet 24 into their extreme lowermost positions as shown in the drawing. When pressure is applied through the pressure port 15, it acts against the lower end of the poppet 24 and the annular lower face 40 of the seat member 20 to move the poppet and seat member upwardly against the force of the spring 29. When the pressures reaches a predetermined magnitude for which the valve has been adjusted, the compression of the spring 29 permits the upper end of the valve stem 25 to contact the stop 35, thereby preventing further upward movement of the poppet 24. Up to this point, the entire force developed by the pressure fluid against both the poppet 24 and the seat face 40 has been effective to compress the spring 29. Thereafter, however, since the poppet 24 is restrained from further upward movement by the stop 35, only the force of the fluid pressure acting against the annular seat face 40 is effective against the spring 29. Therefore, the pressure in the port 15 will rise substantially following movement of the valve stem 25 against the stop 35 before it becomes sufficient to overcome the force of the spring 29.

As soon as the pressure in the port 15 acting against the seat face 40 reaches a value sufficient to overcome the spring force, it carries the seat member 20 upwardly, thereby opening the seat 23 away from the poppet 24 and permitting escape of pressure fluid from the port 15 into the recess 22, thence through the ports 27, passage 26 and ports 28 of the valve stem 25 into the upper portion of the bore 11 and thence out through the relief port 16.

I have found that, by suitably proportioning the diameter of the stem 25 and the stem passage 221 relative to the diameter of the seat 23, a very uniform flow characteristic can be obtained with the valve construction of Fig. 1, as compared to a valve construction in which the fluid escapes freely to the relief port after it has once passed the poppet valve. Thus, referring to Fig. 2 there are shown two curves 41 and 42 respectively illustrating different pressure characteristics. The curve 42 represents the characteristic obtainable with the construction of Fig. 1. Curve 41 shows the pressure versus flow characteristic of the same valve when the ports 27 and 28 and passage 26 in the stem 25 are made so large that there is substantially no pressure drop between the recess 22 and the relief port 16.

When the construction is such that fluid can escape very freely from the recess 22 to the relief port 16, there is little pressure effective against that portion of the movable seat 20 which lies between the stem passage 221 and the seat 23, and substantially the only force effective to move the seat member 20 against the spring 29 is that of the pressure fluid against the annular face 40. Hence the opening movement of the valve seat 23 away from the poppet 24 is determined by the spring rate of the spring 29, increasingly higher pressures in the pressure port 15 being necessary to move the seat 23 farther away from the poppet 24. As shown in Fig. 2, by the curve 41, the pressure necessary to crack the valve, is much lower than that necessary to produce full rated flow. Thereafter, as the pressure is reduced, the flow rate continuously diminishes until the valve recloses at a pressure noticably lower than the cracking pressure.

On the other hand, when the ports 27 and 28 and/or the passage 26 are restricted in size so as to offer appreciable resistance to fluid flow therethrough, a pressure drop is developed between the recess 22 and the upper portion of the bore 11 which is effective against the projected area of the recess 22 to help move the valve seat member 20 into a more fully open position. It may appear paradoxical that the total resistance to flow is decreased by increasing the resistance to flow of a portion of the flow path, but such is the case. The reduction in resistance produced by the wider opening between the seat 23 and the poppet 24 is much larger than the increase in resistance produced by reducing the size of the ports 27 and 28. The curve 42 of Fig. 2 represents the results actually obtained with a valve constructed as shown in Fig. 1. It will be observed that the cracking pressure is the same with both types of construction, and this is to be expected because, before fluid flow occurs, the force effective to open the valve is only that of the fluid pressure acting against the annular face 40. However, whereas curve 41 continues to rise rapidly as the flow increases, the curve 42 quickly flattens out and remains substantially flat throughout the major portion of the flow range. The valve reseats at a pressure only slightly below the cracking pressure, whereas, in the valve having the characteristic represented by curve 41, the reseating pressure was substantially lower than the cracking pressure.

Since the upper portion of the bore 11 above the movable seat member 20 is directly vented to the relief passage 16, high pressures can never be built up in this portion of the bore. Furthermore, except when the pressure in the pressure port 15 is near the opening pressure, the valve stem 25 is out of contact with the adjustable stop stem 35. Therefore, the stop stem is easily turned to change the adjustment.

The valve is very easy to construct since it consists of relatively few and simple parts. By simply taking off the two end plates 12 and 13, all of the interior parts can be pushed out of the bore 11.

The proper proportioning of the valve stem passage 221 and the valve stem 25, and the ports 27 and 28 to obtain a desired operating characteristic which may be that shown by curve 42 in Fig. 2, can be readily determined by experiment. However, as an illustration, a valve actually tested and having the characteristics illustrated by the curve 42 of Fig. 2 had the following dimensions:

| | |
|---|---|
| Diameter of bore 11 | 1" |
| Diameter of seat 23 | 5/8" |
| Diameter of stem passage 221 | 9/32" |
| Diameter of ports 27 (two) | .130" |
| Diameter of ports 28 (two) | .130" |
| Diameter of stem bore 26 | .130" |
| Length of stem bore 26 between ports 27 and 28 | 27/32" |

Various departures from the exact construction shown can be made while still utilizing the advantages of the invention which is to be limited only to the extent set forth in the appended claims.

I claim:

1. A relief valve comprising: a body member having a bore extending therethrough and means for closing opposite ends of said bore; a pressure port communicating with said bore adjacent one end thereof and a relief port communicating with said bore at a point longitudinally spaced from said pressure port; an annular valve seat member slidably positioned in sealing relation with said bore between said pressure and relief ports, said seat member having a poppet seat at its pressure end and a valve stem passage of lesser diameter than the seat passage adjacent its other end; a poppet valve having a stem extending through said valve stem passage and reciprocable with respect to said seat member between open and closed positions; spring means interposed between said seat member and the closure means at the relief port end of said bore; a stop element supported by the closure means at the relief port end of said bore and projecting axially into said bore for engaging said stem in response to predetermined movement of said poppet valve with said seat member; and means including said valve stem defining a restricted fluid passage of appreciable resistance between said valve seat and said relief port.

2. A relief valve comprising: a body member defining a pressure port, a relief port, and a passage interconnecting said ports; a reciprocable piston member in said passage between said ports and spring means urging it toward said pressure port, said piston member having a flow passage therethrough, a poppet valve reciprocable with respect to said piston member and normally closing the pressure port end of said flow passage; and means for limiting movement of said poppet valve toward said relief port; whereby movement of said piston member by pressure fluid entering said pressure port moves said piston member and poppet valve together until said poppet valve contacts said stop means and thereafter moves said piston member away from said poppet valve to discharge fluid through said flow passage to said relief port, said flow passage being of smaller diameter adjacent the relief port end thereof than at the pressure end thereof, said reduced portion constituting a valve stem guide, and said poppet valve having a hollow stem extending through said valve stem guide and having a restricted port to constitute a portion of said flow passage, said flow passage being of such size as to offer appreciable resistance to fluid flow relative to the resistance to fluid flow past said poppet valve when the latter is in open position, whereby a pressure drop is created which is effective against said piston member to aid in moving it away from said poppet valve.

FREDERICK W. SCHNECK.

REFERENCES CITED

The following references are of record in the file of this patent:

UNITED STATES PATENTS

| Number | Name | Date |
|---|---|---|
| 146,716 | Schmidt | Jan. 20, 1874 |
| 1,072,334 | Kulla | Sept. 2, 1913 |
| 1,495,599 | Konkowski | May 27, 1924 |
| 1,563,847 | Hall | Dec. 1, 1925 |
| 2,039,638 | Druge | May 5, 1936 |